United States Patent
Kelley

(10) Patent No.: US 7,632,069 B2
(45) Date of Patent: Dec. 15, 2009

(54) ADAPTABLE FLOW-DRIVEN ENERGY CAPTURE SYSTEM

(75) Inventor: Gene Ryland Kelley, Santa Barbara, CA (US)

(73) Assignee: W2 Energy Development Corporation, Santa Barbara, CA (US)

( * ) Notice: Subject to any disclaimer, the term of this patent is extended or adjusted under 35 U.S.C. 154(b) by 195 days.

(21) Appl. No.: 11/205,752

(22) Filed: Aug. 16, 2005

(65) Prior Publication Data
US 2007/0040389 A1   Feb. 22, 2007

(51) Int. Cl.
F03D 5/06   (2006.01)

(52) U.S. Cl. .............................. 416/80; 416/82; 416/83; 415/4.2

(58) Field of Classification Search .................. 415/2.1, 415/3.1, 4.1, 4.3, 4.5, 7, 8; 416/80, 79, 82, 416/83, 19
See application file for complete search history.

(56) References Cited

U.S. PATENT DOCUMENTS

| | | | | |
|---|---|---|---|---|
| 237,851 | A | * | 2/1881 | Foskett ......................... 416/80 |
| 2,465,285 | A | * | 3/1949 | Schwickerath ............... 416/41 |
| 4,470,770 | A | * | 9/1984 | Grose ......................... 417/334 |

* cited by examiner

*Primary Examiner*—Edward Look
*Assistant Examiner*—Dwayne J White
(74) *Attorney, Agent, or Firm*—Koppel, Patrick, Heybl & Dawson

(57) ABSTRACT

A fluid flow-driven energy conversion system configured to oscillate in the presence of fluid flow. The system comprises an adjustable electromechanically controlled fluidfoil, a balance beam, a compensatory weight and an angle of attack positioner to adjust the angle of attack of the fluidfoil with respect to fluid flow. The fluidfoil is controlled to permit a consistently optimum angle of attack into the prevailing flow. The kinetic energy of the oscillating action is transferred to a connector for energy transfer to one of a variety of energy storage systems for converting the energy of the linear oscillating motion to other desired forms of energy.

13 Claims, 3 Drawing Sheets

ADAPTABLE FLOW-DRIVEN ENERGY CAPTURE SYSTEM

BACKGROUND OF THE INVENTION

1. Field of the Invention

The subject matter of the application generally relating to converting and storing the kinetic energy of a flowing fluid. More particularly, the subject matter of the application relates to the conversion and storage of wind power and hydropower.

2. Description of Related Art

Windmills and wind turbines are generally well known in the art. Windmills traditionally include a plurality of blades or vanes connected to a rotatable shaft. Wind (or other fluids) act upon the blades to create an aerodynamic or hydrodynamic reaction upon the blades causing the shaft and blades to rotate about the axis of the shaft. Windmills have traditionally been employed across the world to: pump water, grind grain and crush stone. Additionally, windmills have been employed in systems that convert kinetic energy, namely wind, into electrical energy. The rotation of the blades of a windmill drives a generator, which in turn produces an electric current. For applications that require linear actuation, additional mechanical systems are required to translate the rotation of the blades into such linear motion, further complexifying a windmill's operation.

Wind turbines are designed to work between certain wind speeds. The lower speed, called the 'cut in speed' is generally 4-5 $ms^{-1}$, as there is too little energy below this speed to overcome system losses. The 'cut out speed' is determined by the ability of the particular machine to withstand high wind. The 'rated speed' is the wind speed at which the particular machine achieves its maximum rated output. Above this speed, it may have mechanisms that maintain the output at a constant value with increasing wind speed.

Windmills and wind turbines require frequent repair and maintenance. Blades can be damaged by high winds and the complex mechanisms that have been devised to accommodate for such must be frequently inspected and maintained. Additionally, while windmills and wind turbines present emission-free options to oil- and gas-fueled power plants, they have been implicated in the annual deaths of tens of thousands of birds, some of which are endangered. Besides the loss of life, repair and maintenance are necessitated as a result of a number of such avian fatalities.

Hydropower plants operate similarly to harness the kinetic energy of flowing water to generate electricity. Hydropower plants generally include a dam, one or more turbines and a corresponding number of generators. Each turbine is positioned at the dam such that water flowing through the dam strikes and turns the turbine's blades. Each turbine is attached to a generator via a shaft such that rotation of the turbine turns the generator producing an electrical current. However, while wind turbines are designed to rotate orthogonal to airflow, hydropower turbines are generally designed to rotate parallel with water flow. Therefore, improvements to wind turbines are not easily translatable to hydropower turbines.

Therefore, what is needed in the art is a system for capturing and storing the kinetic energy of a flowing fluid. What is further needed is such a system that is simpler in construction and provides greater efficiencies than current wind turbines and/or hydropower turbines. Additionally, what is needed is a system that requires less maintenance and repair.

SUMMARY OF THE INVENTION

It is to the solution of the hereinabove mentioned problems to which the present invention is directed. In accordance with the present invention there is provided an adaptable flow-driven energy conversion system comprising:

A support mast having a base and a top, the support mast affixed to a surface at said base thereof;

A balance beam having a first end and a second end and extending therebetween, said balance beam comprising a force arm side extending from said second end thereof in the direction of said first end and a load arm side extending from said first end thereof in the direction of said second end, said force arm side and said load arm side coterminating at a balance beam fulcrum, said balance beam pivotally attached to the top of the support mast at the balance beam fulcrum;

A compensatory weight attached the force arm side of the balance beam, said compensatory weight selected to equalize the weight disposed about the balance beam fulcrum;

A fluidfoil mast extending between at least one fluidfoil, defining two ends, said fluidfoil mast pivotally connected to the load arm side of said balance beam;

At least one fluidfoil pivotally attached to the fluidfoil mast, said at least one fluidfoil having a leading edge and a trailing edge cooperatively defining an edge axis extending therebetween, said fluidfoil further having an orthogonally disposed longitudinal axis;

An angle of attack positioner attached between the at least one fluidfoil and the fluidfoil mast, said positioner moderating fluidfoil angle of attack with respect to fluid flow;

A vane disposed posterior the at least one fluidfoil, said vane registering fluid flow forces that are not parallel with the fluidfoil edge axis;

At least one control rod having a support masthead end and a fluidfoil mast end, said control rod pivotally attached thereto and extending parallel the balance beam affixed to the support mast.

It is an objective to provide a fluidfoil and associated electromechanical assembly capable of extracting energy from low to high velocity prevailing winds for the conversion of such.

It is further an objective to provide for the selectable control of positive and negative lift on a fluidfoil by changing fluidfoil attitude.

It is another objective to provide an energy recapture device for conserving and reusing the energy forces required for controlling fluidfoil transitions from positive to negative lift related orientations.

The adaptable fluid flow-driven system is uniquely configured to oscillate in the presence of and orthogonal to the direction of fluid flow. Each of the at least one fluidfoil is dynamically positioned to promote a constant and optimum angle of attack.

A balance beam is rotatably affixed to a support mast at a fulcrum point. The balance beam comprises a force arm and a load arm with each extending from opposed ends of the balance beam and coterminating at the fulcrum. The force arm and the load arm are different lengths thereby providing the mechanical advantage that enables the oscillatory motion even in the presence of low energy fluid flow. Energy of such fluid flow is a function of the fluid density and velocity.

The support mast is affixed to a surface and includes a rotational portion disposed at a point along the length thereof such that the mast may rotate at a side of the rotational portion opposed the ground.

A counterweight is attached to the force arm such that the weight at either side of the balance beam fulcrum is substantially equivalent. Given the unequal lengths of the force arm and the load arm, there is a mechanical advantage at the force arm side of the balance beam equal to the product of the length of the load arm multiplied by the length of the force arm.

A fluidfoil is aligned with a fluid flow by a vane attached at the load arm side of the fulcrum. Lift is created across the fluidfoil in proportion to fluid flow velocity and the characteristics of the fluidfoil well known to those skilled in the art of fluidfoils, such as airfoils. Control rods each extend equidistantly and parallel to the balance beam and are pivotally affixed to the support mast.

A fluidfoil mast is attached to the balance beam and control rods in a like manner and extends in parallel to the support mast. This arrangement forms a dynamic rhomboid assembly that allows the fluidfoil to maintain an optimum angle of attack into fluid flow by adjusting that angle.

An angle of attack positioning mechanism adjusts the fluidfoil's angle of attack to a constant positive or negative lift position thus enabling an up and down motion that produces lift in both directions and creating an energy converting capability from low velocity as well as high velocity fluid flows including wind and water flow.

Kinetic energy from the fluidfoil is transferred by the lever action of the rhomboid assembly to a connector for energy transfer to one of a variety of energy storage systems for converting the energy of the linear oscillating motion to other desired forms of energy. Such systems include generators or compressors or the like.

As the fluid foil oscillates through positive and negative lift modes, the energy expended to make the transition is partially recaptured by an energy recapture device. This is a dual function device that dampens and stops the upward or downward motion of the fluidfoil as the angle of attack positioner changes the fluidfoil from a positive to a negative lift or vice versa.

The transition point at which the foil changes from positive to negative lift and vice versa requires energy to be extracted from the positive upward momentum and stored as the action is stopped and turned around. An energy recapture device in conjunction with cam actions, solenoids, air compression pistons or calibrated springs is employed for this purpose. When this action is completed and the foil reverses its lift generating capability, the stored energy is transferred back to the foil by the energy releasing function of the energy recapture device to aid in quickly regenerating a negative lift component in the downward cycle. The same occurs in the negative to positive lift transition.

For a more complete understanding of the subject matter of the application, reference is made to the following detailed description and accompanying drawings. In the drawings, like reference characters refer to like parts, in which:

DESCRIPTION OF THE PREFERRED EMBODIMENTS

Figure 1:
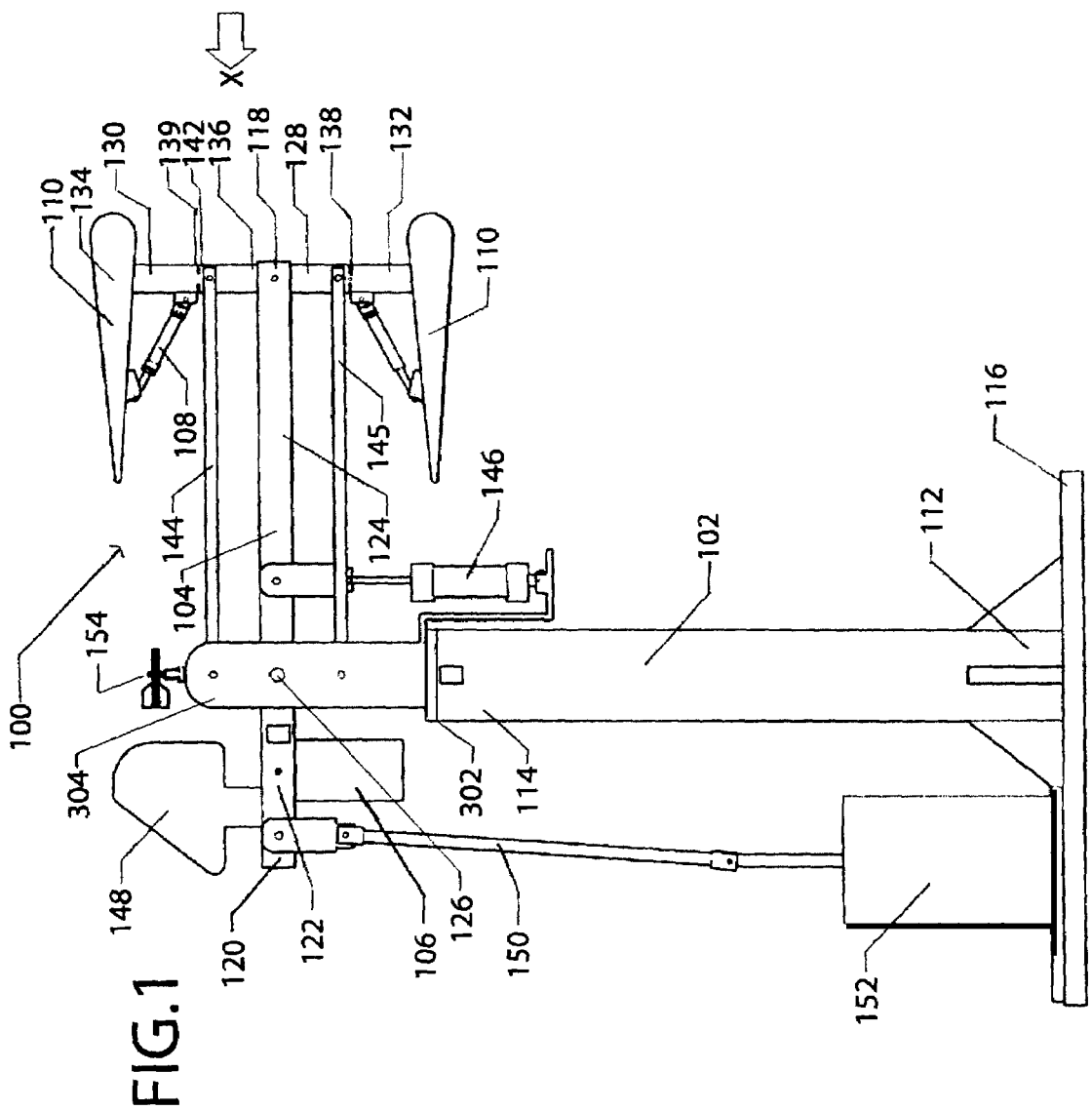
FIG. 1 is a plan view of a preferred embodiment of an adaptable flow-driven energy capture system.
Figure 2:
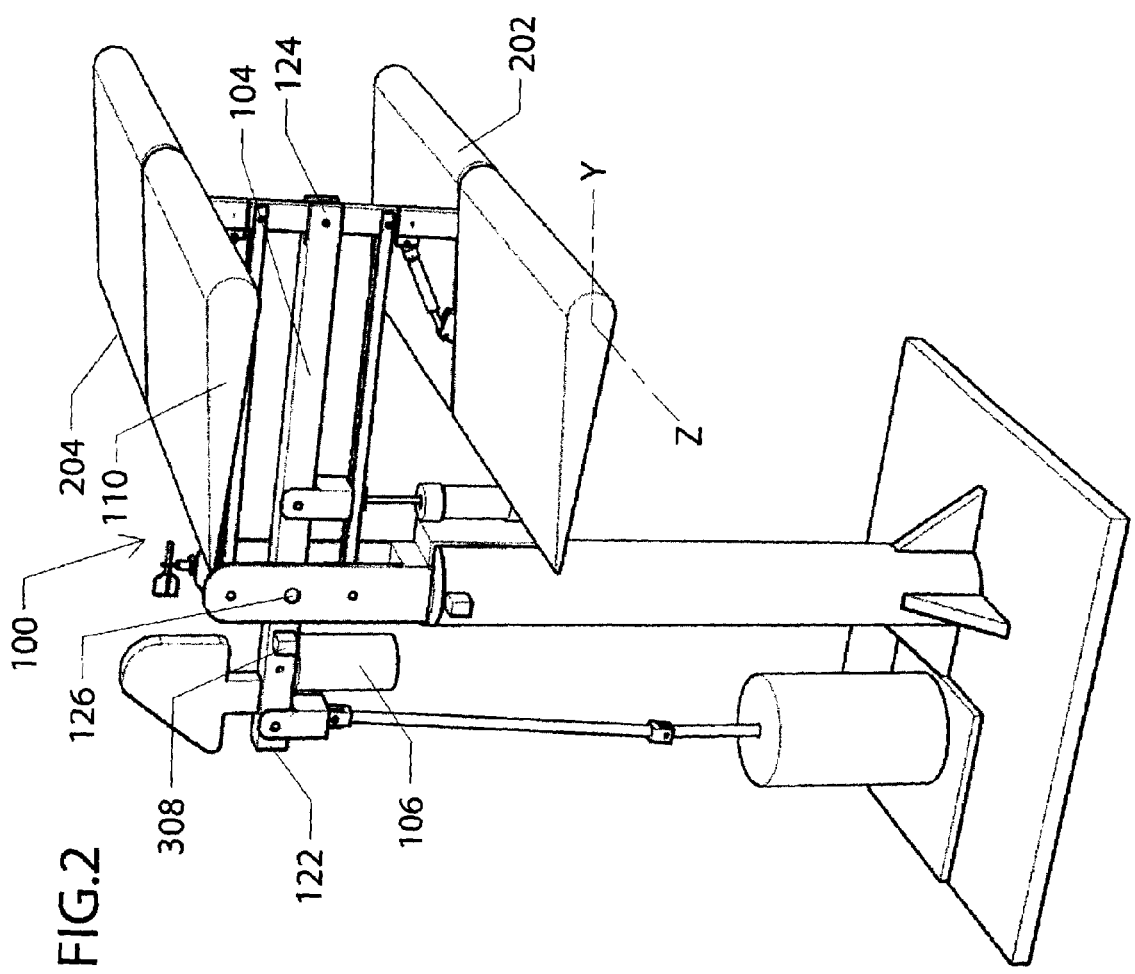
FIG. 2 is an elevated lateral perspective view of a balance beam and fluidfoil mast portions of an adaptable fluid flow-driven energy conversion system in accordance with the preferred embodiment.

Referring to the drawings more particularly by reference numbers, FIGS. 1 and 2 show an adaptable fluid flow-driven energy conversion system 100. The system 100 is uniquely configurable to oscillate in the presence of and orthogonal to the direction of fluid flow (shown as 'X'). Fluid flow may include airflow, running water, or some other fluid the properties of which fall within about the properties of water and air.

The system 100 generally includes a support mast 102, a balance beam 104, a counterweight 106, an angle-of-attack positioner 108 and an at least one fluidfoil 110. The support mast 102 has a base 112 and a top 114, the support mast 102 is attached to a ground 116 at said base 112 thereof. The support mast 102 may be formed from corrosion resistant strong lightweight materials. Additionally, the material should withstand the forces associated with the reciprocating movement of the balance beam 104 resulting from movement of the at least one fluidfoil 110. Aluminum, titanium, composite or some other material well known to one skilled in the art may be used.

The balance beam 104 has a first end 118 and a second end 120 and extends therebetween. The balance beam 104 is preferably formed from a strong, lightweight material that resists corrosion. Such materials are well known in the art and include aluminum, titanium, or some other material well known for such properties. The balance beam 104 comprises a force arm side 122 extending from said second end 120 thereof in the direction of said first end 118 and a load arm side 124 extending from said first end 118 thereof in the direction of said second end 120, said force arm side 122 and load arm side 124 each coterminate at a balance beam fulcrum 126. The balance beam 104 is pivotally and rotatably attached at the top 114 of the support mast 102 at the balance beam fulcrum 126.

The force arm side 122 and the load arm side 124 are different lengths. More particularly, the load arm side 124 of the balance beam 104 is longer than the force arm side 122 providing a mechanical advantage at the force arm side 122 of the balance beam 104. As discussed further hereinbelow, by configuring the relative lengths of the force arm side 122 and the load arm side 124, one is able to configure the system 100 depending upon the conditions under which the system is operating.

Figure 3:
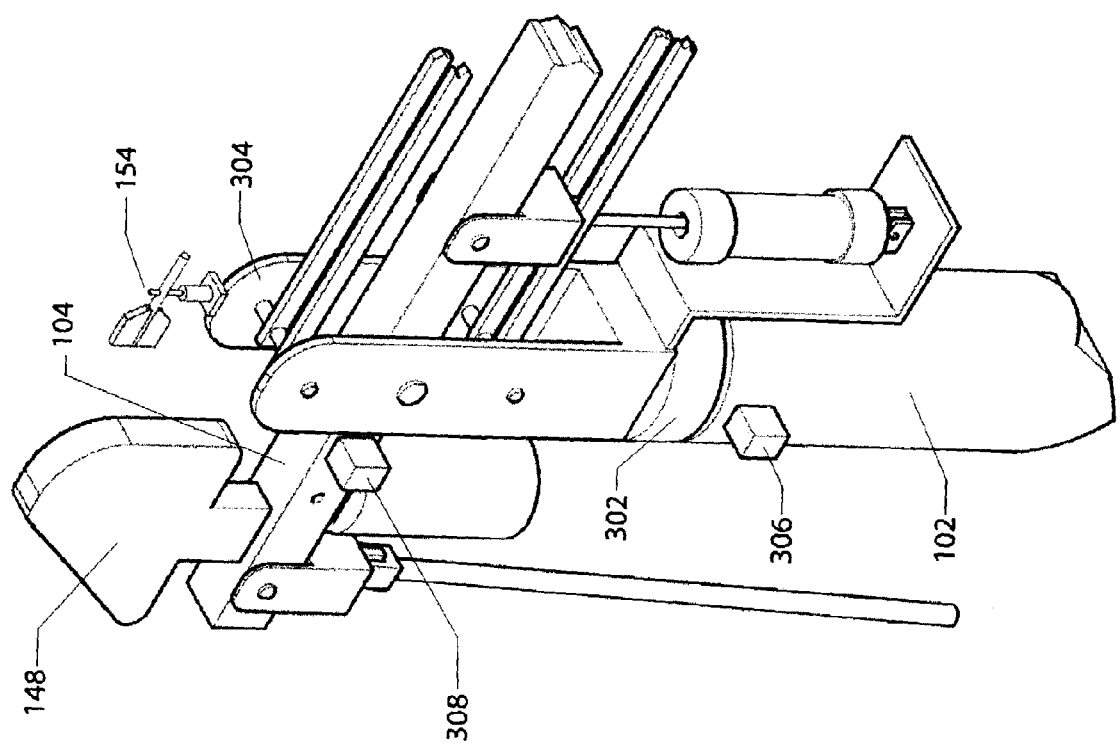
FIG. 3 is a side perspective view of the preferred embodiment.

As shown in FIG. 3, the support mast 102 houses a bearing 302 to which is affixed a support masthead 304 that extends coaxially and rotates about a longitudinal axis of the support mast 102. Force sensing means 306 sense rotational forces at the bearing 302. Such force sensors are known to those skilled in the art and as such shall not be further discussed herein. The support masthead 304 is preferably formed from materials known to those skilled in the art to function similarly to those comprising the balance beam 104 and the support mast 102.

Referring back to FIGS. 1 and 2, the counterweight 106 is attached to the force arm side 122 of the balance beam 104 and is selected to equalize the weight at either side of the fulcrum 126. The means for attaching the counterweight 106 preferably provide for removably attaching the counterweight 106 such as clamping or bolting, or some other means for removable attachment well known to those skilled in the art. The unequal lengths of the force arm side 122 and the load arm side 124 create a mechanical advantage at the force arm side 122 of the balance beam 104.

A fluidfoil mast 128 has a first end 130 and a second end 132 and extends therebetween. The fluidfoil mast 128 is pivotally connected at the force arm side 124 of the balance beam 104. Each at least one fluidfoil 110 is pivotally attached to the fluidfoil mast 128 at a fluidfoil pivot point 134. The fluidfoil mast 128 additionally comprises a center section 136 having two opposed ends 138, 139. End sections 140, 141 are rotatably attached one at each end 138, 139 through a motor or some other well-known means for rotating 142 one element relative another. In this fashion, each of the at least one fluid foils 110 can be rotated about the longitudinal axis of the foil support mast 128.

Referring back to FIGS. 1 and 2, each fluidfoil 110 comprise a leading edge 202 and a trailing edge 204 that define an edge axis (Y) extending therebetween. As most easily viewed in FIG. 2, each at least one fluidfoil 110 further defines a longitudinal axis (Z). While the system 100 will function with at least one fluidfoil 110 as disclosed, it is to be appreciated that the at least one fluidfoil 110 in the preferred embodiment comprises two substantially identical fluidfoils. In other embodiments, the system 100 can have more than two substantially identical fluidfoils.

Lift is created across the at least one fluidfoil 110 in proportion to fluid flow velocity and characteristics of the fluidfoils, 110 well known to those skilled in the art of fluidfoils, including airfoils. Control rods 144, 145 each extend preferably equidistantly and parallel to the balance beam 104 and are pivotally affixed to the support masthead 304 and the fluidfoil mast 128 respectively via well-known pivotal mounting means. This arrangement forms a dynamic rhomboid assembly that allows the fluidfoil 110 to maintain an optimum angle of attack into fluid flow by restricting the travel of the fluidfoil mast 128 to remain perpendicular to the ground 116.

The angle of attack positioner 108 is attached between the at least one fluidfoil 110 and the fluidfoil mast 128. By pivoting the at least one fluidfoil 110 about pivot point 134, the angle of attack positioner 108 moderates the at least one fluidfoil's 110 angle of attack with respect to fluid flow X therepast. As such, each of the at least one fluidfoil 110 is alternatingly positioned to maintain the angle of attack at a generally constant positive or negative lift position depending upon the direction of travel of the balance beam 104. Sensing means 308, such as an optical encoder, potentiometer or other well-known rotational sensors is preferably disposed about the fulcrum.

When the balance beam 104 reaches the limit of travel as indicated by the position indicated by the sensing means 308, the angle of attack positioner 108 is activated to reverse the angle of attack. As such, given the configuration of the preferred embodiment, the angle of attack positioner 108 is configured to receive such control signals. Varying the angle of attack enables the reciprocating up and down motion that produces lift in both directions and facilitates energy conversion from low velocity as well as high velocity fluid flows. Note that the terms 'up' and 'down' are with respect to the defined ground 116.

When the balance beam 104 reaches the limit of travel as indicated by the position indicated by the sensing means 308, the angle of attack positioner 108 is activated to reverse the angle of attack. As such, given the configuration of the preferred embodiment, the angle of attack positioner 108 is configured to receive such control signals. Varying the angle of attack enables the reciprocating up and down motion that produces lift in both directions and facilitates energy conversion from low velocity as well as high velocity fluid flows. Note that the terms 'up' and 'down' are with respect to the defined ground 116.

While fluid flow velocity is within a predetermined range, the positioner 108 maintains the fluidfoil 110 at an optimum angle of attack to provide maximum lift. When fluid flow exceeds such a range, positioner 108 alters the angle of attack, effectively reducing lift to guard against damaging the system 100. A fluid flow meter 154, such as but not limited to the WindMate wind meter produced by SpeedTech, Inc., located in Great Falls, Va. 220666, can be used to measure wind speed. Such information is used to adjust the angle of attack at times when wind speeds exceed a selected threshold. Wind meters are well known to those skilled in the art and as such shall not be discussed further herein.

As the at least one fluidfoil 110 oscillates through positive and negative lift modes, the energy expended to make the transition between such is partially recaptured by an energy recapture device 146. The energy recapture device 146 dampens and stops the upward or downward motion of the at least one fluidfoil 110 as the angle of attack positioner 108 changes the fluidfoil from a positive to a negative lift or vice versa.

A transition point at which the fluidfoil 110 changes from positive to negative lift and vice versa requires energy to be extracted from the travel momentum and stored as the action is stopped and turned around. An energy recapture device 146 in conjunction with cam actions, solenoids, air compression pistons or calibrated springs is employed for this purpose. Such devices and their function with regard to reciprocating motion are well known in the art. As the balance beam 104 reaches its maximum travel, the energy recapture device 146 drives the movement of the balance beam 104 in the opposite direction from that it was traveling to aid in quickly regenerating a negative lift component in the downward cycle. The same occurs in the negative to positive lift transition.

A vane 148 is attached posterior to the at least one fluid foil 110. Preferably the vane 148 is positioned at the second end 120 of the balance beam 104. The vane 148 is configured so that fluid flow incident thereto serves to apply rotational force at the force sensing means 306 at the bearing 302. The rotational force, or torque, at the bearing 302 is communicated to the means for rotating 142 to rotate the at least one fluidfoil 110, about the fluidfoil support mast 128, in response to the sensed torque. In another embodiment, rotation in response to the sensed torque takes place at the bearing 302 and not about the fluidfoil mast 128.

The vane 148 is attached to the balance beam 104 via well-known mounting means including brackets, or bolts and is preferably removably mounted to ease in repair or replacement if such is required. Alternatively, the vane 148 may be permanently affixed by welding or some other well-known means for permanent attachment. Additionally, the vane 148 is preferably formed from a lightweight corrosion-resistant material consistent with the other elements of the preferred embodiment.

Kinetic energy from the fluidfoil is transferred by the lever action of the rhomboid assembly to a connector 150 for energy transfer to one of a variety of energy storage systems for converting the energy of the linear oscillating motion to other desired forms of energy. Such systems include, for example electrical generators. Alternatively, the connector 150 may drive a compressor 152 for compressing air.

While certain exemplary embodiments of the present invention have been described and shown on the accompanying drawings, it is to be understood that such embodiments are merely illustrative of and not restrictive on the broad invention, and that this invention not be limited to the specific

The Invention claimed is:

1. An adaptable flow-driven energy conversion system, comprising:
   a balance beam having a pivot;
   a compensatory weight attached to said beam on one side of said pivot;
   at least one fluidfoil moveably connected to said beam on the opposite side of said pivot from said weight, wherein the direction of a fluid flow is from said fluidfoil towards said compensatory weight, said at least one fluidfoil causing said balance beam to pivot in response to fluid flow over said fluidfoil, wherein the range of oscillation displacement of said balance beam varies due to the force of fluid flow over said fluidfoil;
   an angle of attack positioner attached to operate on said fluidfoil to control an angle of attack of said fluidfoil with respect to fluid flow; and
   a converter connected to convert motion of said balance beam to a desired form of energy.

2. The energy conversion system of claim 1, said balance beam comprising:
   a force arm extending from a first end in the direction of a second end;
   a load arm extending from said second end in the direction of said first end; and
   said balance beam rotatably attached to a support mast, said support mast comprising a bearing affixed to a support masthead.

3. The energy conversion system of claim 2, wherein said force arm is a different length than said load arm.

4. An adaptable flow-driven energy conversion system, comprising:
   a balance beam having a pivot;
   a compensatory weight attached to said beam on one side of said pivot;
   at least one fluidfoil moveably connected to said beam on the opposite side of said pivot from said weight, wherein the direction of a fluid flow is from said fluidfoil towards said compensatory weight, said at least one fluidfoil causing said balance beam to pivot in response to fluid flow over said fluidfoil, wherein the range of oscillation displacement of said balance beam varies due to the force of fluid flow over said fluidfoil;
   an angle of attack positioner attached to operate on said fluidfoil to control an angle of attack of said fluidfoil with respect to fluid flow;
   a converter connected to convert motion of said balance beam to a desired form of energy; and
   a fluid flow meter that measures a rate of fluid flow over said fluidfoil to adjust said angle of attack in response to said rate.

5. An adaptable flow-driven energy conversion system, comprising:
   a balance beam having a pivot;
   a compensatory weight attached to said beam on one side of said pivot;
   at least one fluidfoil moveably connected to said beam on the opposite side of said pivot from said weight, wherein the direction of a fluid flow is from said fluidfoil towards said compensatory weight, said at least one fluidfoil causing said balance beam to pivot in response to fluid flow over said fluidfoil, wherein the range of oscillation displacement of said balance beam varies due to the force of fluid flow over said fluidfoil; said fluidfoil further comprising:
     a leading edge;
     a trailing edge, wherein said leading edge and trailing edge define an edge axis extending therebetween; and
     said fluidfoil pivotally connected to a fluidfoil mast that is pivotally connected to a load arm;
   an angle of attack positioner attached to operate on said fluidfoil to control an angle of attack of said fluidfoil with respect to fluid flow; and
   a converter connected to convert motion of said balance beam to a desired form of energy.

6. The energy conversion system of claim 5, wherein said fluidfoil oscillates through a positive and a negative lift mode.

7. The energy conversion system of claim 6, wherein said positive lift mode corresponds to said fluidfoil positioned in an upward angle resulting in upward movement of said balance beam.

8. The energy conversion system of claim 6, wherein said negative lift mode corresponds to said fluidfoil positioned in a downward angle resulting in downward movement of said balance beam.

9. The energy conversion system of claim 5, wherein said fluidfoil is substantially orthogonal to the direction of fluid flow.

10. An adaptable flow-driven energy conversion system, comprising:
    a balance beam having a pivot;
    a compensatory weight attached to said beam on one side of said pivot;
    at least one fluidfoil moveably connected to said beam on the opposite side of said pivot from said weight, wherein the direction of a fluid flow is from said fluidfoil towards said compensatory weight, said at least one fluidfoil causing said balance beam to pivot in response to fluid flow over said fluidfoil, wherein the range of oscillation displacement of said balance beam varies due to the force of fluid flow over said fluidfoil;
    an angle of attack positioner attached to operate on said fluidfoil to control an angle of attack of said fluidfoil with respect to fluid flow, said angle of attack positioner is attached between said fluidfoil and a fluidfoil mast, wherein an oscillation displacement sensor triggers said positioner to invert said angle of attack when said fluidfoil reaches the limits of said positive and negative lift mode; and
    a converter connected to convert motion of said balance beam to a desired form of energy.

11. The energy conversion system of claim 10, wherein said positioner maintains said fluidfoil at an angle of attack to consistently arrive at the limit of a positive and a negative lift mode.

12. An adaptable flow-driven energy conversion system, comprising:
    a balance beam having a pivot;
    a compensatory weight attached to said beam on one side of said pivot;
    at least one fluidfoil moveably connected to said beam on the opposite side of said pivot from said weight, wherein the direction of a fluid flow is from said fluidfoil towards said compensatory weight, said at least one fluidfoil causing said balance beam to pivot in response to fluid flow over said fluidfoil, wherein the range of oscillation displacement of said balance beam varies due to the force of fluid flow over said fluidfoil;
    an angle of attack positioner attached to operate on said fluidfoil to control an angle of attack of said fluidfoil with respect to fluid flow;

a converter connected to convert motion of said balance beam to a desired form of energy; and at least one control rod that extends equidistantly and parallel to said balance beam and is pivotally attached to a support masthead and to a fluidfoil mast.

13. An adaptable flow-driven energy conversion system, comprising:

a balance beam having a pivot;

a compensatory weight attached to said beam on one side of said pivot;

at least one fluidfoil moveably connected to said beam on the opposite side of said pivot from said weight, wherein the direction of a fluid flow is from said fluidfoil towards said compensatory weight, said at least one fluidfoil causing said balance beam to pivot in response to fluid flow over said fluidfoil, wherein the range of oscillation displacement of said balance beam varies due to the force of fluid flow over said fluidfoil;

an angle of attack positioner attached to operate on said fluidfoil to control an angle of attack of said fluidfoil with respect to fluid flow;

a converter connected to convert motion of said balance beam to a desired form of energy; and an energy recapture device that propels the movement of said balance beam in response to said angle of attack positioner inverting said fluidfoil between a positive and a negative lift mode.

* * * * *